United States Patent [19]
Walz

[11] Patent Number: 5,754,019
[45] Date of Patent: May 19, 1998

[54] METHOD AND CIRCUIT ARRANGEMENT FOR OPERATING AN ELECTRIC MOTOR

[75] Inventor: Hubert Walz, Wehingen, Germany

[73] Assignee: Marquardt GmbH, Rietheim-Weilheim, Germany

[21] Appl. No.: 616,911

[22] Filed: Mar. 15, 1996

[30] Foreign Application Priority Data

Mar. 24, 1995 [DE] Germany .......... 195 10 410.2

[51] Int. Cl.$^6$ .................................. H02K 17/32
[52] U.S. Cl. .................. 318/434; 318/138; 81/469; 388/815
[58] Field of Search .................. 318/254, 245, 318/432, 434, 446, 445, 138; 173/12, 1, 862.08, 862.21, 862.23; 81/469, 474, 57.14; 388/937, 815

[56] References Cited

U.S. PATENT DOCUMENTS

| | | | |
|---|---|---|---|
| 4,618,805 | 10/1986 | Hornung | 318/245 |
| 5,038,084 | 8/1991 | Wing . | |
| 5,062,491 | 11/1991 | Takeshima et al. | 173/12 |
| 5,083,068 | 1/1992 | Neef | 318/434 |
| 5,203,242 | 4/1993 | Hansson | 81/469 |

FOREIGN PATENT DOCUMENTS

| | | |
|---|---|---|
| 0 345 539 | 12/1989 | European Pat. Off. . |
| 0 403 460 | 12/1990 | European Pat. Off. . |
| 3230642 | 2/1984 | Germany . |
| 3534052 | 4/1986 | Germany . |
| 3819166 | 12/1989 | Germany . |
| 3938787 | 5/1991 | Germany . |
| 4100157 | 7/1991 | Germany . |
| 4210273 | 9/1993 | Germany . |
| 02 303774 | 12/1990 | Japan . |
| 2 213 291 | 8/1989 | United Kingdom . |
| 94/27349 | 11/1994 | WIPO . |

OTHER PUBLICATIONS

Willy Frank: "Phasenanschnittsteuerungen –problem–bezogen". In: Elektronik, 4/Feb. 22, 1985, pp. 86–90.

Primary Examiner—John W. Cabeca
Attorney, Agent, or Firm—Spencer & Frank

[57] ABSTRACT

The invention relates to a method for operating an electric motor in an electrical hand-held tool, such as an electric screwdriver, battery-powered drill or the like, the electric motor being operated during the operating phase (17) at a first rotation speed, which can possibly be preset variably, until a preset limiting torque is reached. On reaching the limiting torque, the electric motor is switched to a further operating phase, which lasts until the electric motor is switched off manually by the user. In this further operating phase, a final torque (20), which is interrupted periodically by torque pauses (19), is exerted by the electric motor. A circuit arrangement for implementation of this method is also described.

19 Claims, 5 Drawing Sheets

METHOD AND CIRCUIT ARRANGEMENT FOR OPERATING AN ELECTRIC MOTOR

BACKGROUND OF THE INVENTION

The invention relates to a method for operating an electric motor which can be switched on and off manually and which can be operated during an operating phase at a first rotational speed, which may possibly be capable of being variably preset, until a preset limiting torque is reached. The invention also relates to an associated circuit arrangement.

Electrical hand-held tools, such as drills, battery-powered drills, electric screwdrivers or the like, are frequently equipped with a drive for the electric motor, with whose aid the electric motor can be operated at a specific rotation speed. As a rule, the rotation speed can be set variably within certain limits by the user and can thus be matched to the respective material to be machined. It is further known for this drive to be refined in such a manner that the electric motor is switched off by the drive on reaching a torque which is preset by the user. Such operation of the electric motor is disclosed in German Laid-Open Specification 38 19 166 and is used, for example, in screwdriving operation, where a plurality of screws are intended to be screwed in with the same torque.

The circuit arrangement which is disclosed in this Laid-Open Specification for operating the electric motor has a drivable power semiconductor which is used as an electronic switch for application of the operating voltage or application of pulses of the operating voltage to the electric motor, so that the electric motor runs at a specific rotation speed. An integrated drive circuit, which has an output that is connected to the control input of this power semiconductor, is provided for driving the power semiconductor. The drive circuit has a first input, to which a potentiometer circuit is connected. The voltage which can be set variably on the potentiometer circuit represents a reference value for the rotation speed to be set in each case. Furthermore, the drive circuit has a second input for connection of a device, which likewise comprises a potentiometer circuit, for presetting a further voltage, which represents the limiting torque as a reference variable. A device for measuring an actual variable, which corresponds to the electric current flowing through the electric motor, is arranged at a third input of the drive circuit. Since the electric current is proportional to the torque emitted from the electric motor, this actual variable represents the respective torque of the electric motor. This actual variable for the torque is compared in the drive circuit with the set reference variable for the limiting torque. When the actual variable reaches the reference variable, the drive circuit then switches the power semiconductor off, so that the electric motor is switched off.

It has now been found that the screws can rarely be screwed flush into the material using the described screwdriving mode on electric tools having such a circuit arrangement. As a result of inhomogeneities in the material, for example if there are knots in the wood etc., the required torques for screwing in flush fluctuate, so that, in practice, the screws are either not completely screwed into the material, or they are screwed in too deep. This leads to the user not using a mode with torque switch-off at all, it then being just as difficult to achieve a screwing-in depth at the correct position.

SUMMARY OF THE INVENTION

On the basis of this practical experience, the invention is based on the object of specifying a method for operating an electric motor with torque switch-off, which method ensures a machining result in the correct position. Furthermore, it is intended to specify a circuit arrangement for an electric motor for implementation of this method.

This object is achieved, in the case of a method of the generic type described above, in that, on reaching the limiting torque, the electric motor is switched to a further operating phase which lasts until the electric motor is turned off, a final torque, which is interrupted periodically by torque pauses, being exerted by the electric motor in the further operating phase.

The final torque and the torque pause can thus have a specific duration, which can possibly be set variably. The magnitude of the final torque is at least as great as the limiting torque.

According to a further embodiment, the further operating phase comprises second and third phase sections which are repeated mutually alternately, the electric motor being operated in the second phase section at a second rotation speed, which is less than the first rotation speed, during a second time interval, and the electric motor being operated in the third phase section at a third rotation speed, which is greater than the second rotation speed, during a third time interval. The second rotation speed is preferably equal to zero in this case, and the third rotation speed is equal to or greater than the first rotation speed. The second and/or the third time intervals can be preset variably by the user. In the further operating phase, the electric motor can exert the final torque with a soft start in that, after the second phase section has ended, the rotation speed is preferably increased continuously from the second rotation speed to the third rotation speed. This rotation speed increase can be carried out with a profile which can be predetermined by the user.

The circuit arrangement which is used for implementation of the method according to the invention can use AC voltage or DC voltage as the operating voltage. A triac, diac or the like is used as the electronic switch for AC voltage, and a transistor, such as a bipolar transistor, MOSFET or the like, is used for DC voltage. The drive circuit for operation of the electric motor in the operating phase at a first rotation speed is preferably configured as an integrated circuit. The device for periodically switching the electronic switch on again in the further operating phase according to the invention can be implemented by an additional discharge path for the capacitor in the device for presetting the reference variable for the limiting torque. This discharge path is preferably fed back via a diode, a transistor or the like to an input/output on the integrated circuit. An additional circuit, which is equipped with an operational amplifier in series with the diode, can possibly be arranged between the input/output on the integrated circuit and the capacitor.

According to a further embodiment of the invention, an improvement in the regulation can be achieved for the purpose of stabilization of the rotation speed when the electric motor is subject to a load. To this end, a resistor, which is variable with the control voltage, is arranged in the circuit arrangement between the device for presetting the rotation speed and the associated input/output for the supply of the control voltage. As a result of the variable resistor, the regulation characteristic is then dependent on the load on the electric motor, so that the rotation speed of the electric motor remains largely constant in accordance with the reference rotation speed, even when subject to a load.

The variable resistor can be an electronic component having an electrical valve effect, such as a diode, a transistor or the like. The electronic component having an electrical valve effect can be located in a network comprising fixed resistors. The network can in turn comprise a voltage divider which is formed by two fixed resistors, the electronic component having an electrical valve effect being connected to the junction point between the two fixed resistors. The potentiometer tap-off of the potentiometer which is located in the device for presetting is preferably electrically connected to the electronic component having an electrical valve effect.

The advantages achieved by the invention are, in particular, that it makes it possible to operate the electric motor in a high-precision manner even at high rotation speeds, since the electric motor can be switched off by the user in the correct position in a simple manner. If, for example, an electric screwdriver is operated in accordance with the method according to the invention, the screw is screwed into the accommodating material until the preset limiting torque is reached. After this, a changeover is made to the further operating phase, a brief final torque being exerted on the screw in each case, so that the screw is turned further, section by section. The user can then switch the electric screwdriver off between two such sections, where a brief pause in the movement occurs in each case, without any effort, when the screw head is flush with the material surface. In consequence, the screw is screwed-in faster and with better feel, and an improved work result is achieved. The use of the method according to the invention thus reduces the scrap when machining workpieces with the aid of electrical tools. At the same time, a cost saving is achieved in the external wiring to the integrated circuit, since an operational amplifier and external electronic components, which are necessary for the traditional circuitry, can be replaced by a single electronic component having an electrical valve effect.

BRIEF DESCRIPTION OF THE DRAWINGS

Exemplary embodiments of the invention are described in more detail in the following text, and are illustrated in the drawings, in which.

DESCRIPTION OF THE PREFERRED EMBODIMENTS

Figure 1:
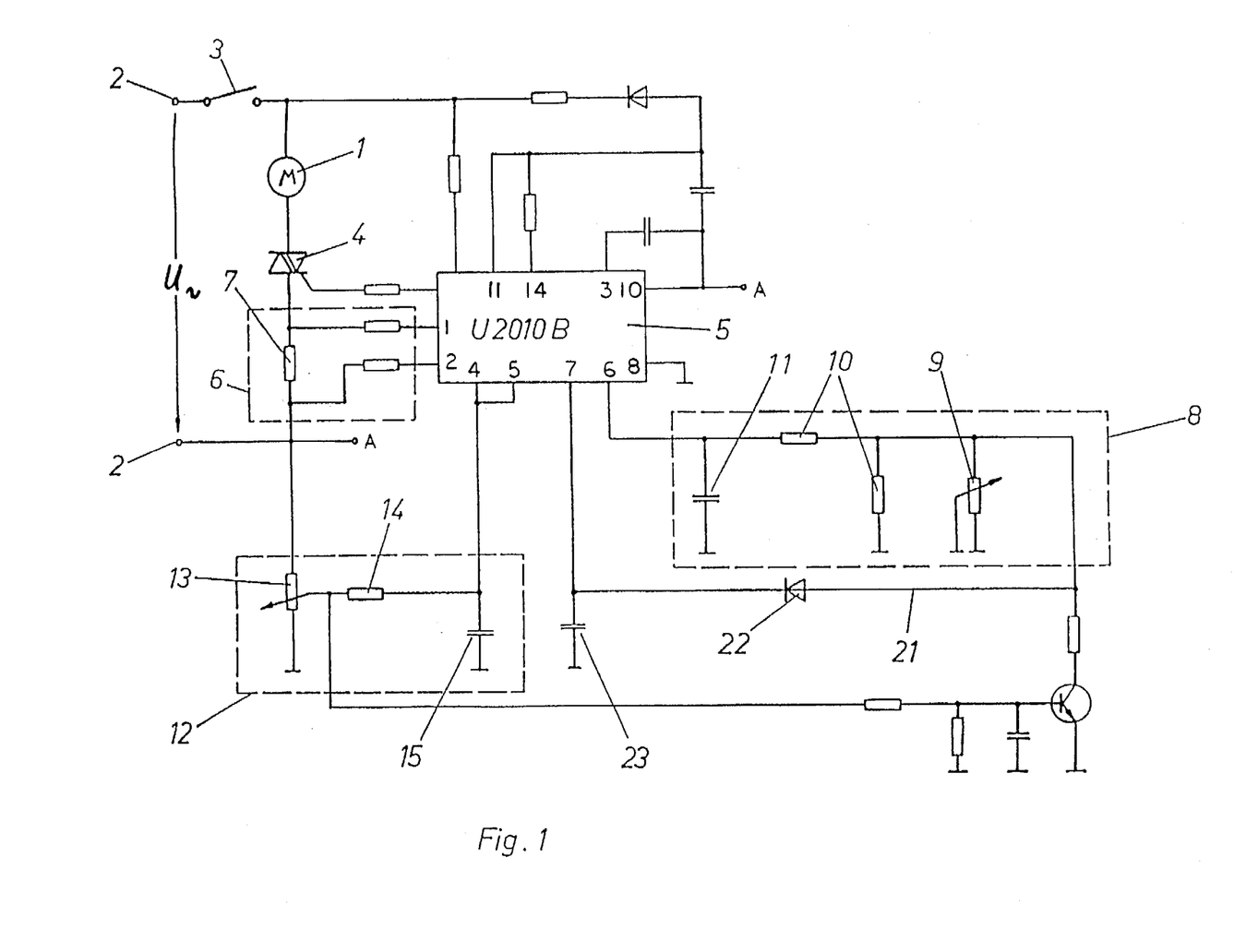
FIG. 1 shows a circuit arrangement for driving an electric motor.

A first embodiment for a circuit arrangement for operating an electric motor 1 having an adjustable rotation speed in accordance with the method according to the invention can be seen in FIG. 1. The electric motor 1 is a universal motor which is fed with an AC voltage as the operating voltage, as is used in particular in handheld electrical tools, for example drills, screwdrivers or the like.

The electric motor 1 is connected to the connections 2 for the operating voltage via an electrical switch 3, which is used for switching the operating voltage on and off manually. An electronic switch 4 which, in the present example, comprises a power semiconductor, for example a triac, is arranged in the motor circuit in order to operate the electric motor 1 at a specific rotation speed. The electronic switch 4 is in turn driven by control electronics, which comprise an integrated circuit 5. The Type U 2010 B from the Telefunken Co. is suitable, for example, as the integrated circuit.

The integrated circuit 5 uses phase-gauging control to set the rotation speed, so that the electronic switch 4 applies pulses in the form of chopped sinusoidal half-cycles of the operating voltage to the electric motor 1. If it is intended to operate the electric motor 1 at maximum rotation speed, then the electronic switch 4 remains permanently switched on or is shorted out, so that complete sinusoidal half-cycles are applied to the electric motor 1. The electric motor 1 can thus be operated at a first rotation speed during the operating phase.

The circuit arrangement has a device 12 for the user to preset the rotation speed for the electric motor 1. This device 12 is configured as a network comprising a potentiometer 13, a resistor 14 and a capacitor 15, this network being connected via the input/output pins 4, 5 to the integrated circuit 5. The user sets the desired rotation speed of the electric motor on the potentiometer 13.

The circuit arrangement is furthermore equipped with a device 6 for measuring an actual variable, which represents the torque of the electric motor 1. Located in this device 6 is a resistor 7, the so-called shunt, which is located in the circuit for the motor current. A voltage drop is thus produced on the resistor 7, which voltage drop is proportional to the motor current and, in turn, is supplied via the input/output pins (1, 2) of the integrated circuit 5. Since the motor current is proportional to the torque produced by the electric motor 1, this voltage drop is equivalent to the actual variable which represents the torque of the electric motor 1.

A device 8 for presetting a reference variable, which represents the limiting torque, is furthermore also located in the circuit arrangement. This device 8 is configured as a network comprising a potentiometer 9, resistors 10 and a capacitor 11. The network is connected to the input/output pins 6, 7 of the integrated circuit 5. The user sets the desired limiting torque on the potentiometer 9.

The other circuitry of the integrated circuit 5 is of relatively little importance to the present purpose and therefore does not need to be explained in more detail here.

Figure 2:
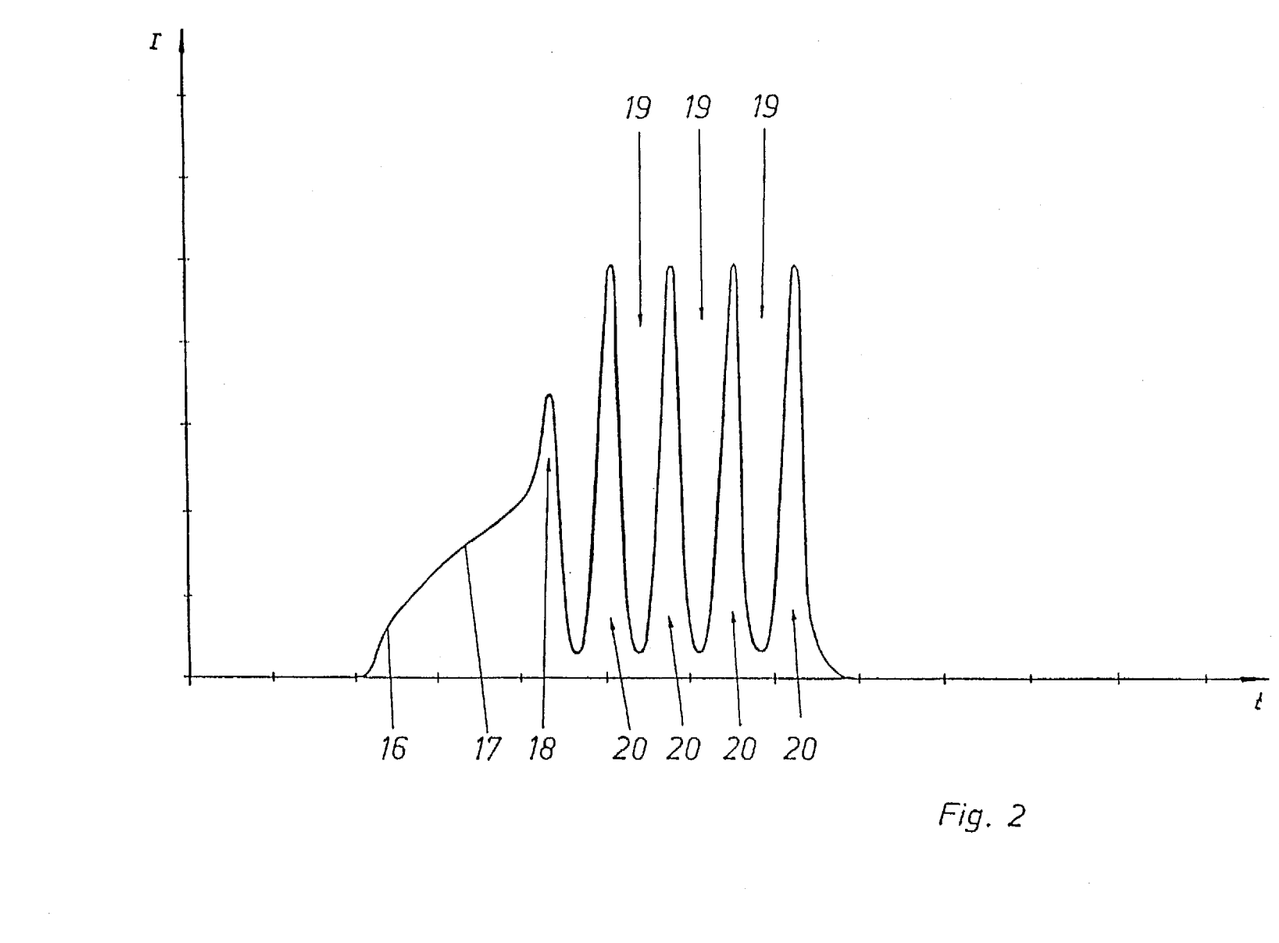
FIG. 2 shows the motor current in a circuit arrangement according to FIG. 1.

If the desired first rotation speed is set on the potentiometer 13 of the device 12 and if the circuit arrangement is switched on by the electrical switch 3, then the electric motor 1 changes to the operating phase. This is shown in more detail in a diagram in FIG. 2, showing the current I, measured with the aid of the resistor 7, as a function of the time t. Initially, the electronic switch 4 is driven by the integrated circuit 5 in such a manner that the rotation speed is accelerated continuously, in a so-called soft start 16, from zero to the desired, preset, first rotation speed. The workpiece is machined at this first rotation speed in the operating phase 17, that is to say, for example, the screw is screwed in until the screw head comes into the vicinity of the material surface. The torque then rises, and the measured current I thus rises very steeply, so that the end 18 of the operating phase is reached.

As soon as the actual variable reaches the limiting torque which is preset on the potentiometer 9 of the device 8 and corresponds to the reference variable, the electric motor 1 is conventionally switched off by the integrated circuit 5. However, in the case of the method according to the invention for operating the electric motor 1, the electric motor 1 switches to a further operating phase on reaching the limiting torque. In this further operating phase, the electric motor 1 is driven by the integrated circuit 5 in such a manner that a final torque 20, which is interrupted periodically by torque pauses 19 of a specific duration, is exerted by the electric motor 1. The magnitude of the final torque is preferably as great as the limiting torque or can possibly even be greater. This further operating phase lasts until the electric motor 1 is switched off manually with the electrical switch 3, which the user can do in the correct position without any effort, since short movement pauses occur in each case corresponding to the torque pauses 19 on the electric motor 1.

The further operating phase preferably comprises second and third phase sections which are repeated mutually alternately. In the second phase section 19, the electric motor 1 is operated at a second rotation speed, which is less than the first rotation speed, during a second time interval. In consequence, the rotor of the electric motor 1 is moved more slowly or remains stationary if the exerted torque is not sufficient for movement. If desired, the second rotation speed can also be zero. In the third phase section 20, the electric motor 1 is operated at a third rotation speed, which is greater than the second rotation speed, during a third time interval, so that the rotor of the electric motor 1 is moved there again. The third rotation speed can be selected to be equal to or even greater than the first rotation speed. Finally, it is also possible for the second and/or third time interval to be presettable variably by the user, for example by means of a further setting device which contains a potentiometer. In this case, the user can set the further operating phase optimally to the requirements of the respective material to be machined.

As already explained, the electric motor 1 is driven at the start of the operating phase by the integrated circuit 5, by means of a soft start 16. The final torque can also be exerted with a soft start in the further operating phase. To this end, after the second phase section has ended and at the start of the third phase section, the rotation speed is in each case increased continuously from the second rotation speed to the third rotation speed. If desired, this soft start can also be designed adjustably, so that it can be adapted by the user to correspond to his requirements.

A device 21 for periodically switching the electronic switch 4 on again with intermediate torque pauses 19 is arranged in the circuit arrangement for implementation of the described method, as can be seen in more detail in FIG. 1. After the operating phase has ended, this device 21 is active as a result of the limiting torque being reached in the further operating phase of the electric motor 1, until the electrical switch 3 is switched off manually. The device 21 is implemented by means of an additional discharge path for the capacitor 11 in the device 8 for presetting the reference variable for the limiting torque, the discharge path being fed back via an electronic component having an electrical valve effect to the input/output pin 7 on the integrated circuit 5. The electronic component having an electrical valve effect may comprise a diode 22, a transistor or the like.

The intention in the following text is now to describe in more detail, with reference to FIG. 1, the method of operation of the circuit arrangement for operating the electric motor 1 in accordance with the described method when using the Type U 2010 B integrated circuit, called IC 5 for short in the following text.

When the mains voltage is switched on by the switch 3, a charging current for charging the input/output pin 7 to a reference voltage is supplied at the input/output pin 7, which results in the soft starting. The soft starting can be further damped by an additional capacitor 23 of appropriate size at the input/output pin 7.

The control voltage which is supplied to the input/output pin 4 by the device 12 and represents the first rotation speed to be set is compared during the operating phase with a ramp voltage, which is synchronized to the mains, at the input/output pin 3. When the ramp voltage at the input/output pin 3 reaches the level of the control voltage at the input/output pin 4, a triggering pulse is passed on from the IC 5 to the electronic switch 4, so that a specific conducting period Ò is provided for the phase gating on the electronic switch 4 for operating the electric motor 1 at the first rotation speed. The motor current, which is detected as the voltage drop across the resistor 7 and is supplied to the pins 1,2, causes a rise in the control voltage at the input/output pin 4, via the input/output pin 5 of the IC 5, when the electric motor 1 is subject to a load. This results in regulation at the first rotation speed in the operating phase, by means of the IC 5.

An output current proportional to the motor current is available at the input/output pin 6. This causes a voltage drop in the device 8, via the resistors 10 and the potentiometer 9, this voltage being additionally smoothed by the capacitor 11. If this voltage at the input/output pin 6 reaches a threshold value of about 6.2 V, then the limiting torque, which is preset using the device 8, is reached and the input/output pin 7 of the IC 5 is internally short-circuited. In consequence, the conducting period Ò for load-current limiting on the electric motor 1 is in turn set to its minimum value, as a result of which the electric motor 1 is at the end 18 of the operating phase.

If, subsequently, the voltage at the input/output pin 6 falls below a value of about 1.5 V, that is to say approximately 25% of the threshold value of 6.2 V, then the IC 5 triggers soft starting once again, which in turn leads to the threshold value of about 6.2 V being reached at the input/output pin 6. An oscillation behavior is thus produced after the end 18 of the operating phase, between desired acceleration, which results in a current rise at the input/output pin 6 until the threshold value of 6.2 V is exceeded, and subsequent discharging of the voltage at the input/output pin 6 to about 25% of the threshold value.

The invention achieves this behavior of IC 5 in that the respective discharge time of the capacitor 11 is set by the additional diode 22, whose cathode is connected to the input/output pin 7, so that the result is an adapted time profile for the described oscillation behavior. In consequence, as the device 21, the diode 22 causes the electronic switch 4 to be switched on again periodically corresponding to a further operating phase, with final torques 20 and intermediate torque pauses 19, the torque pauses 19 being about 0.8 to 1 s. This time can be varied if required, for example, by connecting the anode of the diode 22 via a further resistor directly to the input/output pin 6 of the IC 5 rather than to the potentiometer 9, and by choosing the size of the further resistor appropriately.

Figure 3:
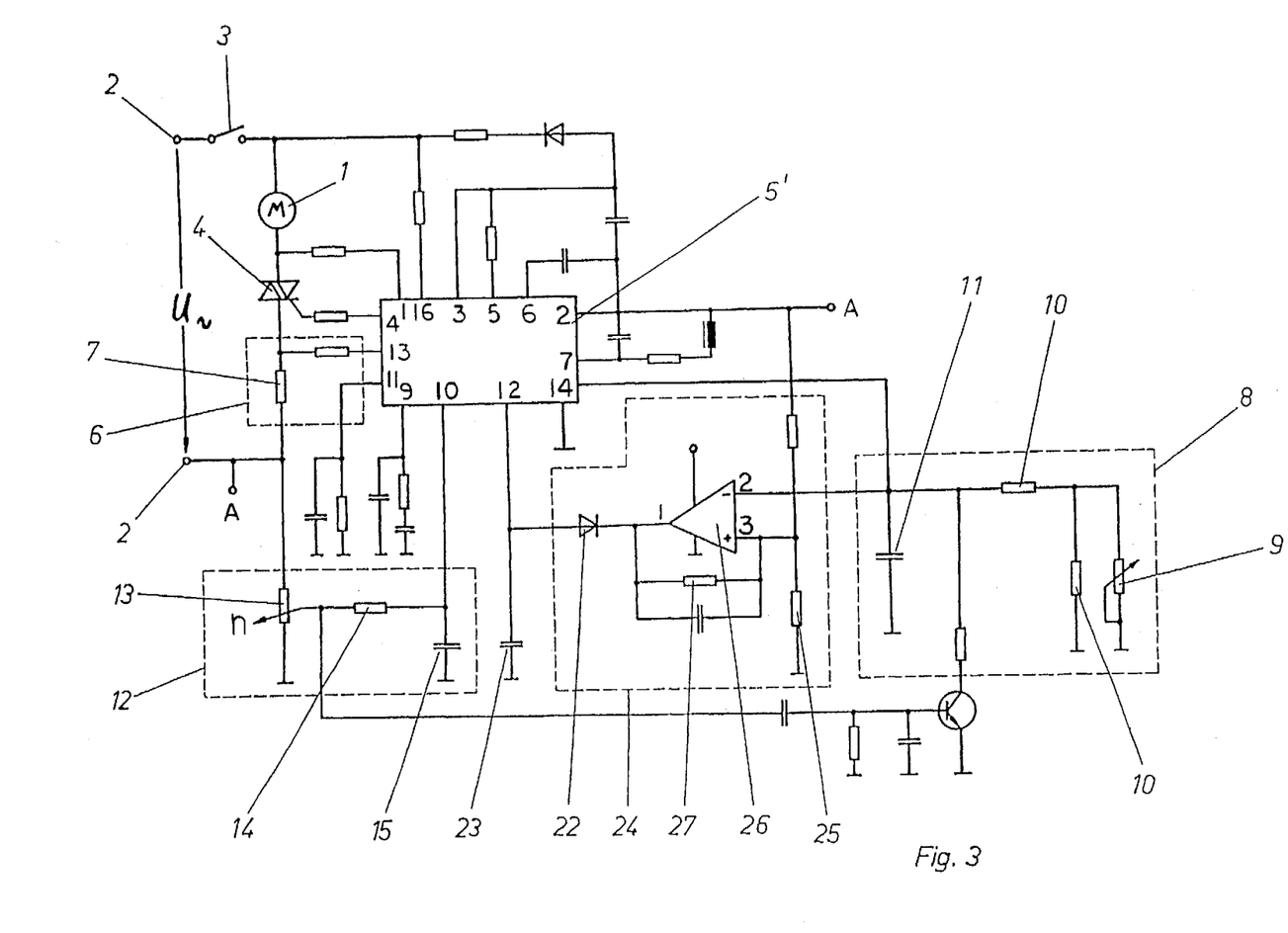
FIG. 3 shows a circuit arrangement as in FIG. 1, in a further embodiment.

In a further exemplary embodiment, which is shown in more detail in FIG. 3, a Type U 211 B3 integrated circuit is used, which is called IC 5', for short, in the following text.

In the case of IC 5', the soft starting is brought about by the charging current which is supplied at the input/output pin 12 for the capacitor 23. The conducting period Ò is set by comparing the ramp voltage at the input/output pin 6 with a control voltage at the input/output 11, the control voltage at the input/output pin 11 resulting from the difference between the reference value and the actual value for the rotation speed, which difference is a function of the load on the electric motor 1. An output current which corresponds to the motor current at the input/output pin 13 is available at the input/output pin 14. This output current is integrated in the capacitor 11. If the voltage, which is proportional to the motor current, on the capacitor 11 exceeds a threshold value, which is set internally in the IC 5', of about 7.3 V, then a store in the IC 5' is set and the regulation for the limiting torque is switched on.

The further operating phase with final torques 20 is controlled by the additional circuit 24. The voltage which is present on the capacitor 11 is compared with a threshold voltage which is present on the resistor 25, in the additional circuit 24. If this threshold voltage is exceeded, the output 1 of an operational amplifier 26 in the additional circuit 24 switches to ground and the input/output pin 12 on the IC 5' for the soft-starting voltage is thus likewise connected to ground, via the diode 22. At the same time, as a result of the voltage being fed back from the output 1 of the operational amplifier 26, via the parallel circuit formed by the resistors 25 and 27, to the input 3 of the operational amplifier 26, the threshold voltage which is present there is reduced, which results in a reliable switching behavior of the operational amplifier 26. The input/output pin 12, which is connected to ground, of the IC 5' results in the minimum conducting period Ö of the IC 5' being set, as a result of which a torque pause 19 occurs on the electric motor 1. In consequence, the charging current of the capacitor 11 is in turn reduced, as a result of which the threshold voltage on the resistor 25 is quickly undershot. For its part, this now causes the output 1 of the operational amplifier 26 to be connected to voltage, as a result of which renewed soft starting at the input/output pin 12 of the IC 5' is triggered, and thus a final torque 20. As a consequence of this, an oscillation behavior is produced in the further operating phase, which causes final torques 20 with intermediate torque pauses 19 on the electric motor 1. The time setting of the oscillation behavior and the setting of the magnitude of the final torques 20 are carried out by appropriate choice of the sizes of the components in the additional circuit 24.

In the case of the circuit arrangement which is shown in FIG. 1 and operates using a Type U 2010 B integrated circuit, it is possible, under some circumstances, for the rotation speed to drop when the electric motor 1 is subject to a load. In a development of the invention, this circuit arrangement can be further improved in terms of the stabilization of the rotation speed in the event of torque changes. This improvement is brought about essentially by arranging a resistor between the integrated circuit 5 and the device 12 for presetting the rotation speed, the size of the resistor being varied as a function of the motor current flowing through the electric motor 1.

Figure 4:
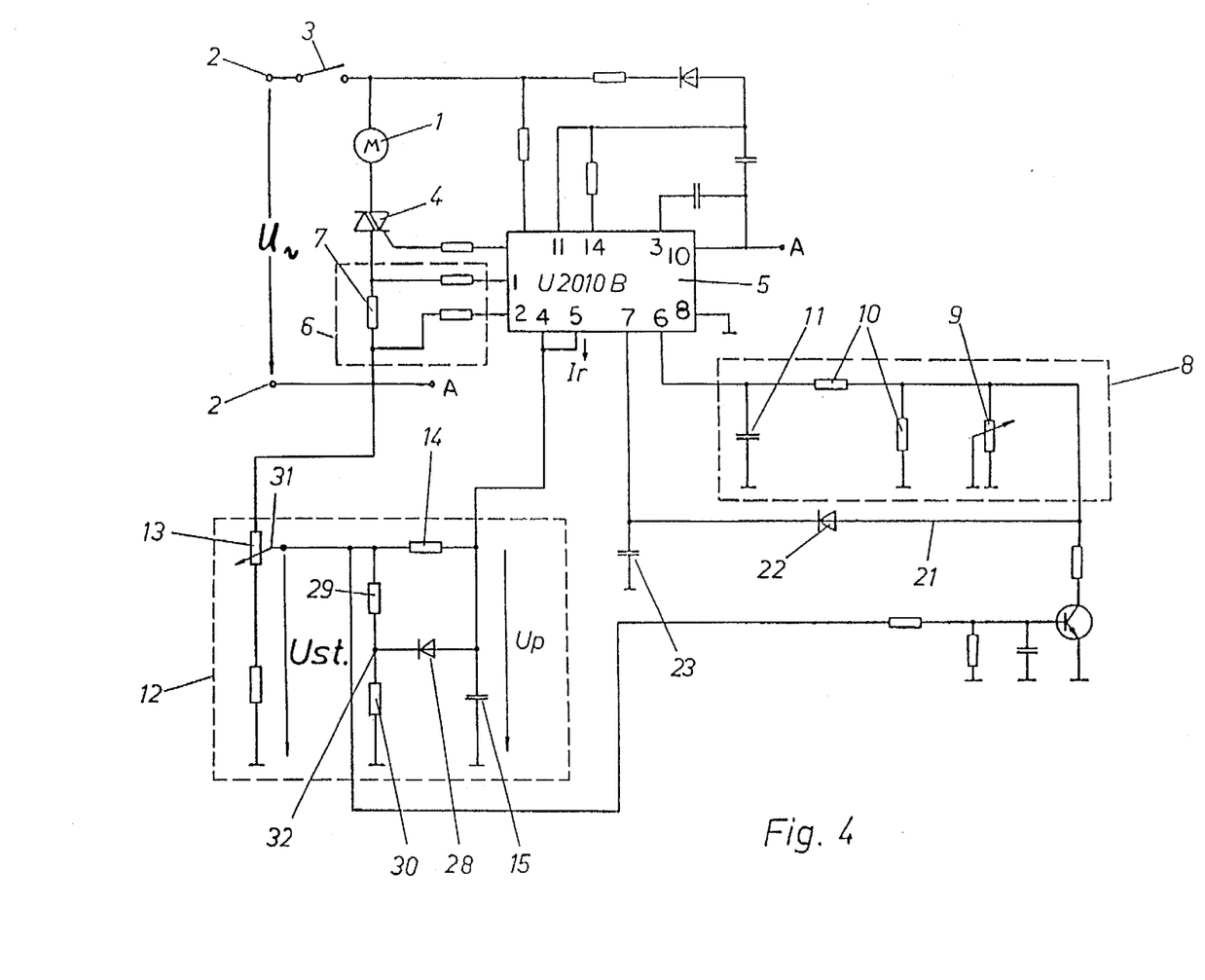
FIG. 4 shows a circuit arrangement as in FIG. 1, in another further embodiment.

Such a circuit arrangement according to the further embodiment of the invention can be seen in more detail in FIG. 4. The circuit arrangement for operating the electric motor 1 once again has an electronic switch 4 for applying the operating voltage and/or pulses of the operating voltage to the electric motor 1. The circuit arrangement once again contains a drive circuit, which is configured as a Type U 2010 B integrated circuit 5, for the electronic switch 4, a device 12 for presetting a rotation speed, a device 6 for measuring an actual variable which represents the torque of the electric motor 1, and, possibly, a device 8 for presetting a limiting torque.

The actual variable, which is measured by the device 6 and represents the torque, is supplied to an input/output pin 1, 2 of the integrated circuit 5. The integrated circuit 5 uses this actual variable to determine a resultant current Ir, which is functionally dependent on the actual variable, and makes this current Ir available at an input/output pin 5 of the integrated circuit 5. A reference value voltage Ust, which is functionally dependent on the rotation speed to be set, is produced in the device 12 for presetting the rotation speed. A control voltage Up, which is fed in at the input/output pin 4 of the integrated circuit 5, is formed from the reference value voltage Ust and the resultant current Ir. The electric motor 1 is operated at the set rotation speed during the operating phase on the basis of this control voltage Up and the rotation speed is regulated in the event of changes to the load on the electric motor 1, as has already been explained further above.

As has been found, an improvement in the regulation can now be achieved, in the sense of stabilization of the rotation speed when the electric motor 1 is subject to a load, in that a resistor 28, which is variable with the control voltage Up, is arranged between the device 12 for presetting the rotation speed with the reference value voltage Ust and the input/output pin 4 of the integrated circuit 5 for supplying the control voltage Up. The variable resistor 28 preferably comprises an electronic component having an electrical valve effect, such as a diode, a transistor or the like, the potentiometer tap-off 31 of the potentiometer 13, which is used to produce the reference value voltage Ust, being connected to the variable resistor 28. The variable resistor 28 can be located in a network comprising fixed resistors 29, 30. The network is a voltage divider which is formed from two fixed resistors 29, 30, the variable resistor 28 being connected by its cathode to the junction point between the two fixed resistors 29, 30 of the voltage divider.

Figure 5:
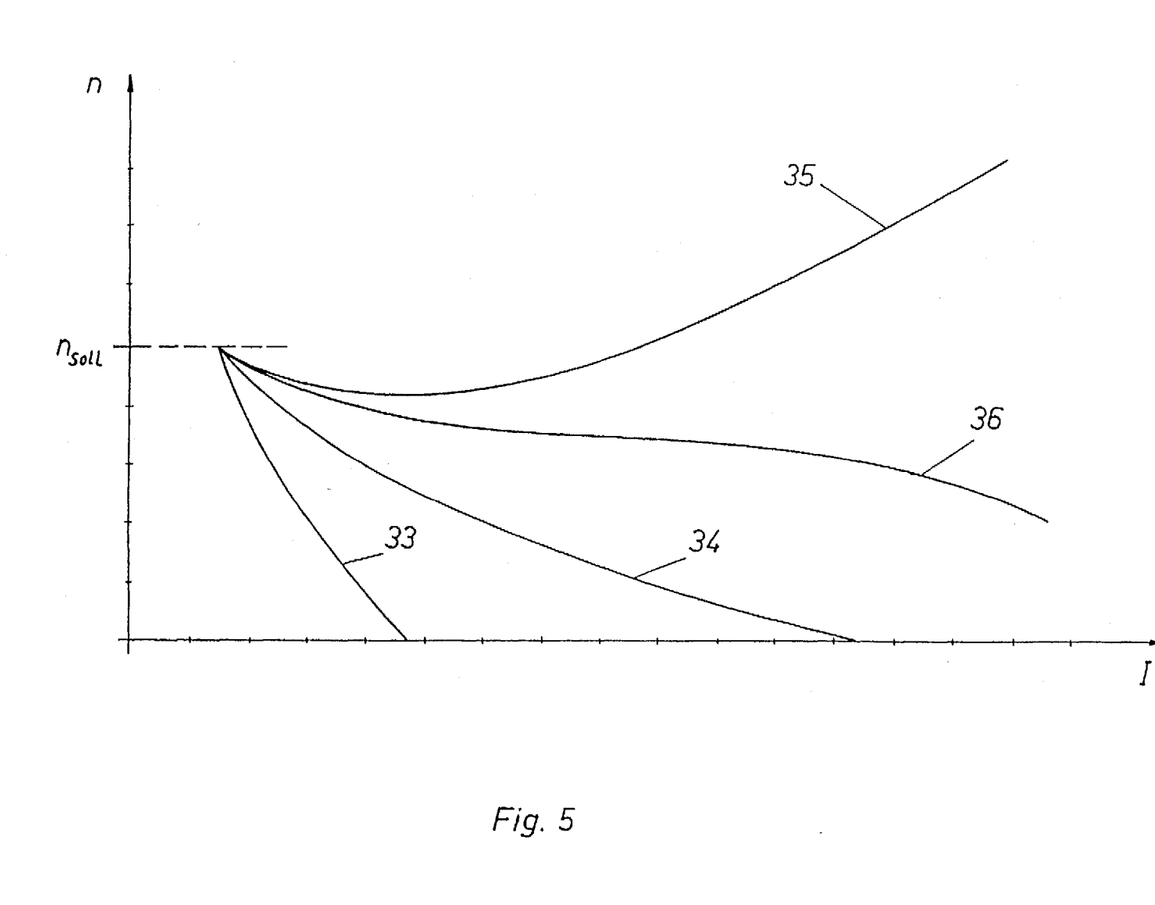
FIG. 5 shows a schematic diagram showing the rotation speed profile of an electric motor subject to a load.

The effect of the variable resistor 28 on the integrated circuit 5 for driving the electric motor 1 can be seen from the schematic diagram according to FIG. 5. The ordinate there shows the rotation speed n of the electric motor 1, the reference rotation speed which is set by means of the device 12 being designated nref. The abscissa shows the motor current I, which in turn is proportional to the torque exerted by the electric motor 1, so that increasing motor current values I in the diagram reflect an increasing load on the electric motor 1.

The reference rotation speed nref is measured on the electric motor 1 when no load is present. Motor operation without regulation is shown by the characteristic 33, for comparison with the regulation according to FIGS. 1 and 4. As can be seen, the rotation speed n falls very rapidly, starting from nref, when the load increases. The characteristic 34 shows regulation corresponding to the circuit arrangement in FIG. 1. The regulation characteristic is determined there by the resistor 14, which has a fixed size. As can be seen, the rotation speed admittedly falls more slowly as the load increases than in the case of the characteristic 33, but the characteristic is still not consistent with stabilization in terms of the reference rotation speed nref. If the regulation characteristic is varied by increasing the size of the resistor 14, then the characteristic 35 is obtained, in the case of which the rotation speed accelerates undesirably when the load increases. Finally, the characteristic 36 shows regulation corresponding to FIG. 4. As a result of the variable resistor 28, the regulation characteristic depends on the load on the electric motor 1 while, in contrast to the previous regulation systems, the regulation characteristic is set in a fixed manner. The regulation gain which results from the regulation characteristic is thus reduced as the load on the electric motor 1 rises, and thus prevents the rotation speed from accelerating undesirably. As can be seen from the characteristic 36, even when subject to a load, the rotation speed remains largely constant, corresponding to the reference rotation speed nref. Thus, particularly in the lower rotation speed ranges, an effective improvement in the rotation speed regulation is achieved.

The invention is not limited to the exemplary embodiments described and illustrated. In fact, it also covers all specialist developments in the context of the idea of the invention. Thus, the invention can also be used in the case of electric motors which are operated by means of DC voltage. In this case, the power semiconductor for the electronic switch is configured as a transistor, such as a bipolar transistor, MOSFET or the like. The circuit arrangement according to the invention can preferably also be arranged in the housing of an electrical tool switch, which allows the rotation speed of the electrical tool to be set by means of a push button which can be moved manually. In addition, the method according to the invention can also be used when the electric motor is running counterclockwise, for example for undoing firmly seated screws.

The following Table is presented to provide a convenient list of the reference numbers that are used in the drawings.

TABLE

1. Electric motor
2. Connection (for the operating voltage)
3. Electrical switch
4. Electronic switch (power semiconductor)
5,5'. Integrated circuit (for control electronics)
6. Device (for torque measurement)
7. Resistor
8. Device (for presetting the limiting torque)
9. Potentiometer
10. Resistor
11. Capacitor
12. Device (for presetting the rotation speed)
13. Potentiometer
14. Resistor
15. Capacitor
16. Soft start
17. Operating phase
18. End of the operating phase
19. Torque pause
20. Final torque
21. Device (for switching the electronic switch on again)
22. Diode
23. Capacitor (for soft starting)
24. Additional circuit (further embodiment)
25. Resistor
26. Operational amplifier
27. Resistor
28. Variable resistor
29, 30. Fixed resistor
31. Potentiometer tap-off
32. Junction point (of the voltage divider)
33. Characteristic (without regulation)
34. Characteristic (with a fixed regulation characteristic)
35. Characteristic (with a fixed, enlarged regulation characteristic)
36. Characteristic (with a variable resistor).

What I claim is:

1. A circuit arrangement for operating an electric motor (1), comprising:

a manually operable switch (3) for turning an operating voltage for the electric motor (1) off and on;

an electronic switch (4) for selectively applying the operating voltage to the electric motor (1);

first means for controlling the electric switch (4) so as to operate the electric motor (1) during a first operating phase at a first rotation speed until a preset limiting torque is reached, the first means including a device (6) for measuring an actual variable, which represents the torque of the electric motor (1), and a device (8) for presetting a reference variable, which represents the limiting torque, and second means, connected to the first means, for causing the first means to control the electric switch (4) so as to operate the electric motor (1) in a second operating phase after the limiting torque has been reached and until the electric motor (1) is turned off with the manually operable switch (3), the electric motor (1) exerting intervals of a final torque (20) separated by torque pauses (19) during the second operating phase.

2. A circuit arrangement according to claim 1, wherein the first means comprises a drive circuit, which is configured as an integrated circuit (5, 5'), for controlling the electronic switch (4) so as to operate the electric motor (1) at the first rotation speed and for switching off the electronic switch (4) on reaching the limiting torque, and wherein the device (8) for presetting the reference variable which represents the limiting torque comprises a network that includes a potentiometer (9), resistors (10) and a capacitor (11), the network being connected, to at least one pin of the integrated circuit (5, 5').

3. A circuit arrangement according to claim 2, wherein the operating voltage is an AC voltage and the electronic switch (4) comprises a circuit component selected from the group consisting of a triac and a diac.

4. A circuit arrangement according to claim 2, wherein the operating voltage is a DC voltage and the electronic switch (4) comprises a transistor.

5. A circuit arrangement according to claim 2, wherein the second means comprises a semiconductor circuit component in a discharge path between the network and a pin on the integrated circuit (5, 5').

6. A circuit arrangement according to claim 5, wherein the semiconductor circuit component is selected from the group consisting of a diode and a transistor.

7. A circuit arrangement according to claim 5, wherein the second means further comprises an operational amplifier which is connected to the semiconductor circuit component.

8. A circuit arrangement according to claim 1, wherein the first means further includes a drive circuit (5) which is responsive to the device (6) for measuring an actual variable which represents the torque of the electric motor (1) and to the device (8) for presetting a reference variable which represents the limiting torque, the drive circuit (5) controlling the electronic switch (4), and wherein the circuit arrangement further comprises a device (12) for variably presetting the first rotation speed which produces a reference value voltage (Ust), the drive circuit (5) making available to the device (12) for presetting the first rotation speed a resultant current (Ir), which is functionally dependent on the actual variable which represent the torque, and a control voltage (Up), which is formed from the resultant current (Ir) in conjunction with the reference value voltage (Ust), the device (12) for presetting the first rotation speed including a resistor (28) which is variable with the control voltage (Up).

9. A circuit arrangement according to claim 8, wherein the variable resistor (28) comprises an electronic component selected from the group consisting of a diode and a transistor, and wherein the device (12) for variably presetting the first rotation speed further includes a network comprising fixed resistors (29, 30) and a potentiometer (13) having a tap-off (31) which is used to produce the reference value voltage (Ust), the electronic component being connected to the network at a junction point (32) between the two fixed resistors (29, 30).

10. A method for operating an electric motor (1) which can be turned on and off manually, comprising the steps of:
   (a) after the electric motor (1) is turned on, driving the electric motor (1) during a first operating phase (17) at a first rotation speed until a preset limiting torque is reached; and
   (b) when the limiting torque is reached, switching the electric motor (1) to a second operating phase which lasts until the electric motor (1) is turned off, the electric motor (1) exerting a final torque (20) which is interrupted periodically by torque pauses (19) during the second operating phase.

11. A method according to claim 10, further comprising the step of using the electric motor (1) to power a hand-held tool.

12. A method according to claim 11, wherein the hand-held tool is one of a screwdriver and a drill.

13. A method according to claim 1, further comprising the step of variably presetting the first rotation speed.

14. A method according to claim 10, wherein the final torque (20) has a magnitude that is at least as great as the limiting torque.

15. A method according to claim 14, wherein the final torque (20) has intervals of predetermined duration between the torque pauses (19), and wherein the torque pauses (19) have a predetermined duration.

16. A method according to claim 15, wherein the durations of the torque pauses (19) and the intervals of final torque (20) between the torque pauses (19) are variable, and further comprising the step of setting the durations.

17. A method according to claim 10, wherein the second operating phase comprises second and third phase sections which are repeated mutually alternately, and wherein step (b) comprises operating the electric motor (1) in the second phase section at a second rotation speed, which is less than the first rotation speed, during a first time interval, and operating the electric motor (1) in the third phase section at a third rotation speed, which is greater than the second rotation speed, during a second time interval.

18. A method according to claim 17, wherein the second rotation speed is equal to zero, wherein the third rotation speed is equal to or greater than the first rotation speed, and further comprising the step of variably presetting at least one of the first and second time intervals.

19. A method according to claim 17, wherein, in the further operating phase, the electric motor (1) exerts the final torque (20) with a soft start in that, after the second phase section has ended, the rotation speed is continuously increased from the second rotation speed to the third rotation speed.

* * * * *